United States Patent [19]

Kirk

[11] 4,153,096
[45] May 8, 1979

[54] APPARATUS FOR INTRODUCING PRESSURIZED GAS INTO A TIRE

[76] Inventor: Norbert A. Kirk, 2970 Sheridan Rd., Chicago, Ill. 60657

[21] Appl. No.: 740,738

[22] Filed: Nov. 10, 1976

[51] Int. Cl.² ............................................. B60C 21/10
[52] U.S. Cl. ................................. 152/415; 152/429; 137/230; 141/285
[58] Field of Search ................. 137/223, 231, 234.5; 141/285, 392, 329, 330, 115; 251/DIG. 1; 152/415, 427, 429; 137/232

[56] References Cited

U.S. PATENT DOCUMENTS

| | | | |
|---|---|---|---|
| 2,043,380 | 6/1936 | Kirkpatrick | 152/427 |
| 2,086,071 | 7/1937 | Ehuts | 141/285 |
| 2,473,912 | 6/1949 | Schwinn | 137/223 X |
| 2,482,922 | 9/1949 | Marcum | 137/223 |
| 2,508,503 | 5/1950 | Doepke | 137/223 X |
| 2,854,020 | 9/1958 | Williams | 137/232 |
| 2,939,478 | 6/1960 | Dockrell | 137/223 |
| 3,410,298 | 11/1968 | Pruitt | 137/223 |
| 3,618,690 | 11/1971 | Johnson | 251/DIG. 1 |
| 3,827,635 | 8/1974 | Krakowski | 137/223 X |
| 3,933,177 | 1/1976 | Dwyer | 137/223 X |

Primary Examiner—Harold W. Weakley
Attorney, Agent, or Firm—Larson, Taylor and Hinds

[57] ABSTRACT

An apparatus including a stem is provided for introducing gas under pressure from a source of pressurized gas into a container. The stem defines a main passageway and has at least one aperture for bleeding gas from the passageway directly to the atmosphere, while gas is simultaneously introduced into the container through the passageway. The number of apertures and size of the apertures vary, depending on the predetermined container pressure desired. The apparatus can be adapted to be removably mounted on, for example, the valve stem of a pneumatic tire. Alternatively, the apparatus can be formed integrally with the valve stem of a pneumatic tire. In a further embodiment, the apparatus is adapted to inflate, for example, basketballs, footballs, and the like.

4 Claims, 7 Drawing Figures

APPARATUS FOR INTRODUCING PRESSURIZED GAS INTO A TIRE

BACKGROUND OF THE INVENTION

1. Field of the Invention

This invention relates to an apparatus for introducing gas under pressure into a container and more particularly an apparatus adapted to prevent the overinflation of the container.

2. Description of the Prior Art

A common way to inflate pneumatic containers such as, for example, a bicycle tire, a football or the like, is to take it to a service station and use the provided air pump. The air supplied by these pumps is generally pressurized to 150 psi, the pressure needed to drive the pneumatic tools used at the station. However, this pressure is far in excess of that needed for most containers, particularly bicycle tires, with a maximum desired pressure of between 70 psi to 90 psi. Most gas stations will have a pressure regulator which can be adjusted to provide a limited pressure below the maximum of 150 psi. However, these regulators are often inaccurate and expensive to repair so that pressure in excess of that desired can be delivered, resulting in the overinflation and even rupture of the tire. Also, when tires of small volume are inflated, the possibility of their rupturing is enhanced due to the relatively short time required to inflate such a tire.

Many devices have been employed in an attempt to prevent excess pressure from accumulating in the container to be inflated. One such device used to limit container pressure is shown in Webb, U.S. Pat. No 3,450,147. The device allows pressurized air to be introduced into the container and includes an aperture closed by a spring-biased seal. The seal is unseated from the aperture so as to release air pressure only when the pressure in the container becomes greater than the spring pressure holding the spring seal against the aperture.

Thus, excess air is removed only after it has been introduced into the inflatable container and the pressure therein has reached or gone beyond the predetermined pressure. And since there exists the possibility of jamming or malfunctioning of the complex device, so as not to release excess pressure, the danger still exists that the container can rupture upon being filled. Further, failure of the seal due to wear and deterioration can result in loss of the ability of the device and inflatable container to retain the proper pressure.

Additional disclosures of valves used to inflate objects can be found in U.S. Pat. Nos. 1,551,710; 1,156,328; 1,004,986; 1,738,621; and 2,954,796.

As many bicycle tires, footballs, basketballs, and other inflatable objects are ruptured every day due to being filled with excess pressure, a need exists for a valve device which does not malfunction and which is easily operated so as to inflate the containers to the proper pressure.

SUMMARY OF THE INVENTION

The present invention provides for an apparatus that overcomes the disadvantages associated with the prior art devices.

In accordance with the preferred embodiment of the invention, an apparatus including a stem is presented for the introduction of gas under pressure into a container. The stem defines a main passageway for connecting the source of gas with the container, the stem having at least one aperture directly connecting the passageway with atmosphere. In use, gas introduced into the main passageway from the source is bled directly from the main passageway through the aperture to the atmosphere while gas from the source is simultaneously introduced into the container through said passageway.

Still a further aspect of the invention is that the stem of the apparatus can be integrally formed with a container valve.

Another aspect of the invention is means for sealingly closing the bleed apertures when, for example, the source of gas includes a hand pump.

In a further aspect of the invention wherein the source of pressurized gas includes a nozzle, the apparatus further includes means securable to the nozzle for bringing the stem into fluid communication with said nozzle.

Another embodiment of the invention includes an apparatus having a stem defining a main passageway, the stem having at least one bleed aperture, and the apparatus further including an elongated needle-like tube defining an elongate passageway, the tube mounted on said stem. The elongate passageway is in fluid communication with the main passageway and is adapted for fluid communication with the container for introducing gas into the container.

A method is presented for introducing gas under pressure from a source of pressurized gas into a container comprising the steps of mounting an apparatus having at least one bleed aperture on the container; introducing the gas from the source of gas into the apparatus; and bleeding gas directly from the apparatus to the atmosphere through the bleed aperture of the apparatus and simultaneously introducing gas into the container through the apparatus.

Additional features and advantages of the invention will be set forth in, or apparent from, the detailed description of the preferred embodiments of the invention found hereinbelow.

DETAILED DESCRIPTION OF THE PREFERRED EMBODIMENTS

Figure 1:
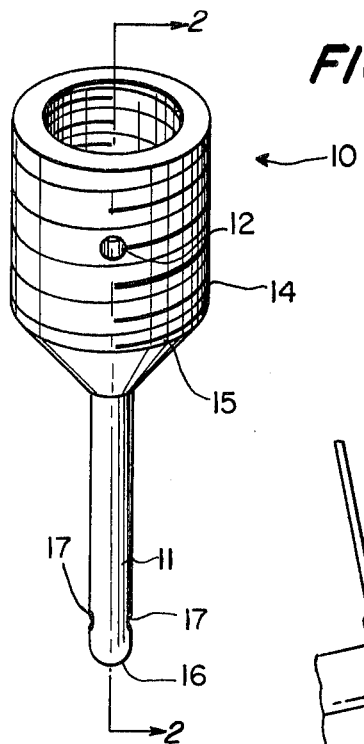
FIG. 1 is a perspective view of the apparatus in accordance with the invention.
Figure 2:
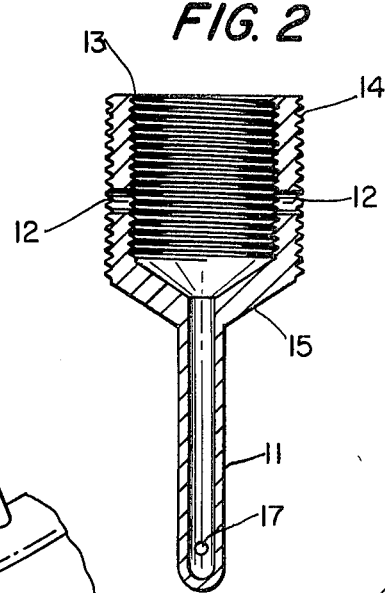
FIG. 2 is a longitudinal cross-sectional view taken through line 2—2 in FIG. 1.

With reference to FIGS. 1 and 2, an apparatus 10, also referred to as a needle, commonly used to inflate objects such as footballs, basketballs, and the like, as shown as a preferred embodiment of the invention. Apparatus 10 includes a cylindrical body 14 having a coaxial, interior passageway, body 14 having threaded internal and external surfaces. End 15 of body 14 is generally funnel-shaped and has extending therefrom an elongate, needle-like tube 11 having a coaxial, interior passageway in fluid communication with the interior passageway of body 14.

Additionally, end 16 of needle-like tube 11 is rounded so as to be easily received by a football or the like. Two apertures 17 are provided in tube 11 for the introduction of pressurized gas into a football and the like.

Apparatus body 14 further includes two apertures 12 communicating between the threaded external surface of body 14 and the passageway of body 14. Apertures 12 are located generally midway between the two ends of cylindrical body 14. Apertures 12 have preferred diameters of from 1/16 to 3/32 inches. Although apertures of larger or smaller diameters can be used.

In operation, the tube 11 is inserted into the inflatable object and a pressurized air source such as that found at a filling station is applied to the opposite end 13. Depending on the size of the two apertures 12, air in excess of a predetermined limit is bled from the valve through apertures 12 to the atmosphere as air is simultaneously introduced into the inflatable object. Alternatively a pressurized air source can be applied to end 13 for a preselected time interval so as to inflate the object.

In alternate embodiments, the number and size of the apertures can be varied so as to attain different pressures in the inflatable object depending on, for example, the maximum pressurized air source pressure.

Figure 3:
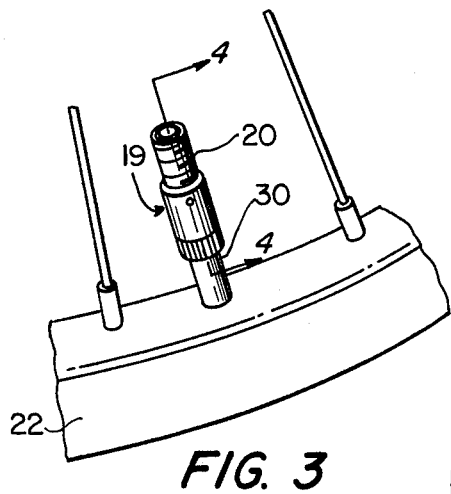
FIG. 3 is a perspective view depicting another embodiment of the invention, mounted onto an inflatable tire.
Figure 4:
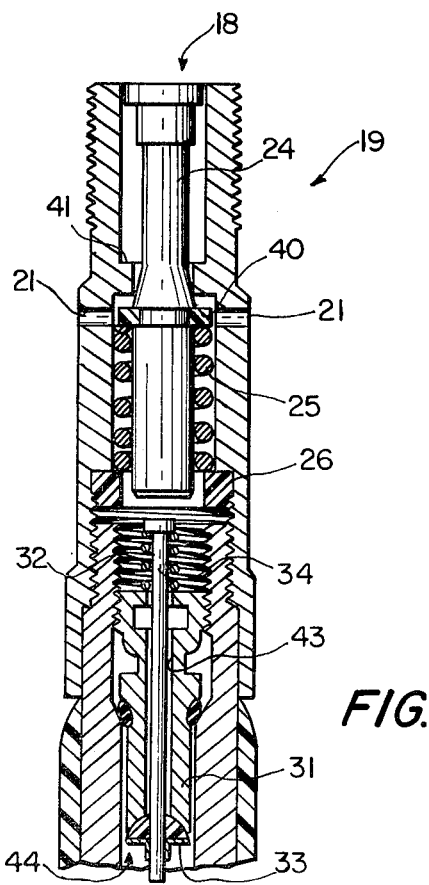
FIG. 4 is a longitudinal cross-sectional view taken along line 4—4 in FIG. 3.
Figure 5:
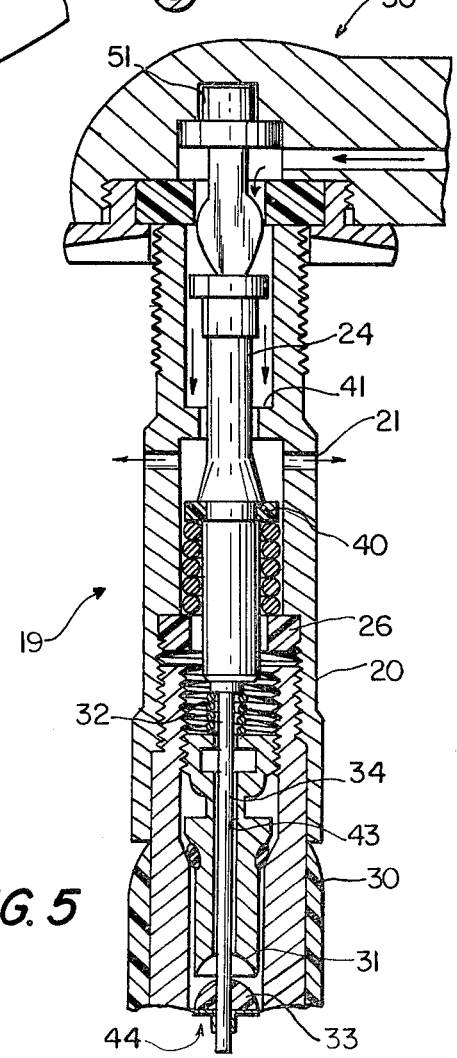
FIG. 5 depicts the longitudinal cross-sectional view of the valve as shown in FIG. 4 with a high pressure gas nozzle mounted atop the valve, so as to urge the valve into an operational mode, pressurized gas being introduced into the valve and tire as indicated by the arrow.

A second embodiment of the invention is shown in FIGS. 3, 4, and 5 and is denoted 19. Apparatus 19 includes an elongate stem-like member 20, adapted to be mounted on the valve stem 30 of a bicycle tire 22. Stem member 20 has a cylindrical internal passageway having internal threads at a lower end thereof. The internal threads are compatable with the external threads of valve stem 30.

Apparatus 19 includes two bleed apertures 21 located through stem-like member 20 so as to provide communication between the internal passageway of apparatus 19 and the exterior surface of apparatus 19. As will be apparent from FIGS. 4 and 5, apertures 19 each are formed by a straight bore extending directly from the internal passageway of hollow stem 20 to the atmosphere surrounding the outer cylindrical wall of hollow stem 20. It is thus apparent that the device is free of means obstructing the bleed apertures. In a preferred embodiment, apertures 21 have diameters from between 1/16 to 3/32 inches. Apertures 21 are positioned above the lower threaded portion of stem member 20. Apparatus 19 further includes a mechanism 18 for opening bicycle valve 30, preparatory to introducing pressurized air therein. Mechanism 18 includes a shaft 24 having a blunted, upper end, and an o-ring 40 secured thereto, that is mounted in the internal passageway of stem member 20 so as to be generally parallel to elongate stem member 20. O-ring 26 is screwed into the lower threaded portion of stem member 20. O-ring 40 of shaft 24 is longitudinally displaceable along the passageway of stem 20 between flange 41 and o-ring 26. In a preferred embodiment, o-rings 26 and 40 can be comprised of, for example, a rubber compound. A spring 25 is coaxially mounted about shaft 24 so as to be positioned between o-ring 40 and o-ring 26. Spring 25 urges o-ring 40 against flange 41, the upper end of shaft 24 extending slightly above the upper end of stem member 20.

Again referring to FIGS. 3, 4 and 5, apparatus 19 of the invention is mounted on a valve stem 30 of a bicycle tire 22. Valve stem 30 is known in the art and includes a valve 44 having a seating member 31 having a passageway 43 therethrough. Seating member 31 has external threads compatible with the internal threads of valve stem 30. Except for passageway 43, seating member 31 provides a seal across the internal passageway of valve stem 30. Valve stem 30 further includes an elongate shaft 34 mounted longitudinally along passageway 43 of seating member 31. Shaft 34 has a sealing member 33 at the lower end thereof and a blunt upper end. Sealing member 33 is preferably comprised of a rubber compound. Sealing member 33 is adapted to sealingly engage passageway 43 of seating member 31 so as to prevent the passage of gas out of tire 22 through valve stem 30. A spring means 32 is coaxially mounted about shaft 34 between the blunted upper end and seating member 31. Spring means 32 urges sealing member 33 against and sealingly closes the passageway 43 of seating member 31.

In operation, apparatus 19 of the invention is mounted on valve stem 30 and a conventional air filling nozzle 50 (FIG. 5) is brought into engagement with the upper portion of apertures member 20 of apparatus 19. The piston 51 of the air nozzle 50 contacts and urges shaft 24 downwardly. Shaft 24 in turn contacts and urges shaft 34 downwardly, unseating sealing member 33 from passageway 43 in seating member 31. Gas under pressure is injected through nozzle 50 into apparatus 19. This air then flows through apparatus 19 out of apertures 21 to the environment and simultaneously through valve stem 30 so as to inflate tire 22. Thus apertures 21 act to bleed excess pressurized gas to atmosphere before the gas enters tire 22. The number and size of appertures 21 may vary to accommodate tires of various pressures. But, it has been found that with a conventional "10-speed" racing bicycle tire having a conventional stem valve and preinflated to the full shape of the tire, but easily yielding to external forces such as that applied by pinching the tire between the fingers, and having the source pressure at 150 psi, two apertures of 5/64 inch effects a tire pressure of approximately 55 psi, when nozzle 50 is held in engagement with apparatus 19 for about seven seconds. With two apertures of 0.070 inch. a tire pressure of about 50 psi is effected in about five seconds and a tire pressure of about 70 psi is effected in about seven seconds with the above-outlined starting conditions. Further, with respect to apparatus with 0.070 inch apertures, the maximum steady state pressure in the tire is about 70 psi even if pressurized air is allowed to flow into apparatus 19 for a period far in excess of seven seconds. In general, maximum steady state pressure in the tire varies depending on the size and number of bleed apertures.

When the desired tire pressure is reached, the air filling nozzle 50 is removed and the sealing member 33 returns in sealing engagement with seating member 31 as shafts 34 and 24 are urged upward, by springs 32 and 25 respectively, to the positions shown in FIG. 4.

Further it should be noted that the transverse diameter of apparatus 19 (FIG. 3) is larger than the transverse diameter of stem 30 or the diameter of an aperture, through the rim of tire 22, through which stem 30 extends.

Thus during this inflation operation, apparatus 19 prevents tire stem 30 from being pushed through the rim of tire 22 and against the inner tube of tire 22, and thus prevents tire stem 30 from rupturing the inner tube of tire 22.

In an alternate embodiment (not shown), the apparatus of the invention is designed to slide over the valve stem of the tire instead of being threadably mounted thereto, as long as an adequate seal is made between the apparatus of the invention and the valve stem of the tire. Further, the embodiment can be made integral with, for example, a conventional bicycle tire stem so as to inflate the tire.

In another alternate embodiment (FIG. 7), the apparatus of the invention can be formed integrally with the valve stem of the tire. This embodiment can be accomplished by adapting a conventional tire valve stem, such as valve stem 30 in FIG. 4, so as to include at least one aperture.

Figure 7:
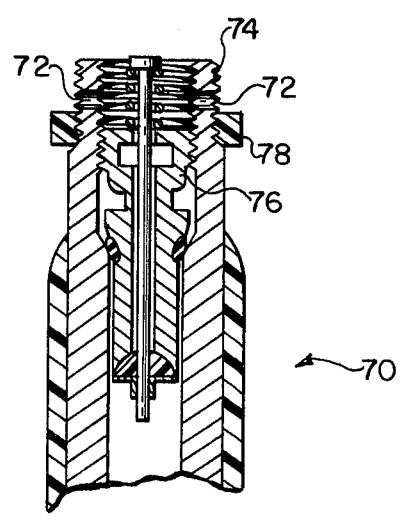
FIG. 7 is a longitudinal cross-sectional view of another embodiment of the invention.

Referring to FIG. 7, apparatus 70 includes two apertures 72 positioned through the wall of the valve stem 74 and located between the upper end of the valve seating member 76 and the upper end of stem 74, which is adapted to receive the nozzle from the source of pressurized air. Apertures 72 allow air to escape from stem 74 while air simultaneously flows into the tire from the pressurized source.

This embodiment further includes an o-ring 78 mounted about stem 74 and slidable longitudinally along stem 74 so as to sealingly close apertures 72. O-ring 78 is preferably comprised of a rubber compound.

It is contemplated that a hand pump means can be used to inflate the tire. When a hand pump is used, o-ring 78 can be slid over and sealingly close apertures 72 so that gas no longer can escape to atmosphere from stem 74 through apertures 72. Consequently, the tire can be efficiently inflated with a hand pump, o-ring 78 slidable out of closing engagement with apertures 72 when a pressurized source of air, such as found at a filling station, is used.

Figure 6:
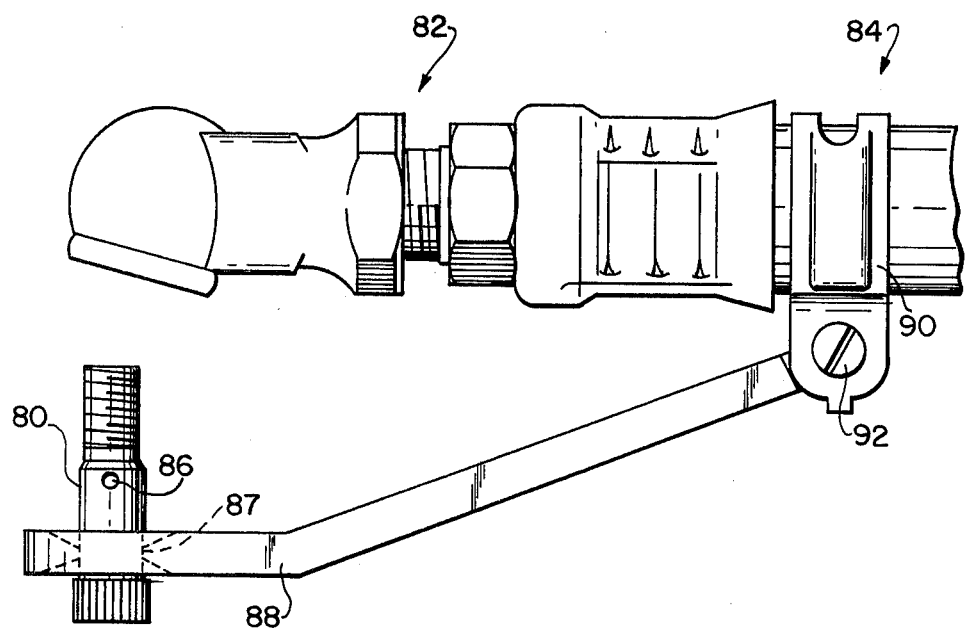
FIG. 6 is a side view depicting the embodiment of FIG. 3 pivotally secured to the nozzle of a source of gas so as to allow the embodiment to be pivoted in and out of fluid communication with the nozzle.

Referring to FIG. 6, an apparatus 80, similar in design to apparatus 19 of FIG. 4 is depicted with a nozzle 82 that is adapted to mount a hose 84 from a high pressure source of gas. Apparatus 80 includes an aperture 86 and is swivelably mounted through a bore 87 in a first portion of a bar member 88, member 88 having a generally rectangular transverse cross-section. The second portion of bar member 88 is bent at a slight angle to the first portion. The second portion is secured to hose 84 by a bracket 90 such that bar member 88 is pivotable about screw 92. As bar 88 is pivoted toward nozzle 82, the upper end of apparatus 80 mates in fluid communication with nozzle 82.

It is contemplated that the embodiment depicted in FIG. 6 can be installed in fluid communication with a source of pressurized gas such as found in a filling station. Thus, for filling a conventional bicycle tire, apparatus 80 can be pivoted into fluid communication with nozzle 82 such that the advantages of the invention are provided while the tire is being filled. Additionally, for filling a conventional automobile tire, apparatus 80 can be pivoted away from nozzle 82, allowing nozzle 82 to be used directly.

Although the present invention has been described relative to exemplary embodiments thereof, it will be understood by those skilled in the art that variations and modifications can be effected in these embodiments without departing from the scope and spirit of the invention.

I claim:

1. An apparatus in combination with a tire for introducing air under pressure from a pressurized source of air into a tire that has a valve having a valve stem for admitting air into said tire, the source of pressurized gas including a nozzle, said apparatus comprising:

an elongate hollow stem, circular in cross section, having a cylindrical wall defining a main passageway having a source end and a tire end for interconnecting the source of air with the tire;

an elongate member mounted for axial movement within said stem in said main passageway;

means for securing said tire end of said hollow stem to said valve stem of said valve;

spring means urging said elongate member into a first, withdrawn position in said main passageway, said elongate member being movable, in said main passageway, against said spring means into a second, extended position for opening the tire valve to permit introduction of the pressurized air through said main passageway, through said valve, and into the tire;

an outer sealing means located in said main passageway for preventing the exhaust of air through the source end of said elongate hollow stem when said elongate member is in said withdrawn position;

and vent means permanently open to the atmosphere for constantly venting the portion of said main passageway between said tire end thereof and said outer sealing means, said vent means consisting of at least one straight bore through said cylindrical wall, each bore forming a bleed aperture in said stem extending directly from said main passageway through said cylindrical wall to atmosphere outside said wall, said bores each having a diameter of from 1/16 inch to 3/32 inch, such that, in use, gas introduced into said main passageway from the source is bled directly from the main passageway through each bleed aperture to atmosphere while gas from the source is simultaneously introduced into the tire through said passageway, the apparatus being free of means for obstructing the flow of gas through the bleed aperture or apertures.

2. The apparatus of claim 1 wherein said stem includes two bleed apertures diametrically opposite one another on said stem, each aperture having a diameter of approximately 0.070 inch and extending radially of said main passageway.

3. The apparatus of claim 1 wherein said stem includes two bleed apertures diametrically opposite one another on said stem, each aperture having a diameter of approximately 5/64 inch and extending radially of said main passageway.

4. The apparatus of claim 1 wherein said apparatus further includes means securable to the nozzle of the pressurized air source for positioning said elongate hollow stem into fluid communication with said nozzle.

* * * * *